US009156727B2

(12) United States Patent
Siebers et al.

(10) Patent No.: US 9,156,727 B2
(45) Date of Patent: *Oct. 13, 2015

(54) TRANSPARENT, DYED COOKTOP (75) Inventors: Friedrich Siebers, Nierstein (DE);
Thomas Zenker, Nieder-Olm (DE);
Helga Goetz, Heidesheim (DE); Martin Taplan, Mainz (DE)

(73) Assignee: SCHOTT AG, Mainz (DE)

( * ) Notice: Subject to any disclaimer, the term of this patent is extended or adjusted under 35 U.S.C. 154(b) by 1009 days.

This patent is subject to a terminal disclaimer.

(21) Appl. No.: 13/256,268

(22) PCT Filed: Feb. 1, 2010

(86) PCT No.: PCT/EP2010/051162
§ 371 (c)(1),
(2), (4) Date: Nov. 18, 2011

(87) PCT Pub. No.: WO2010/102859
PCT Pub. Date: Sep. 16, 2010

(65) Prior Publication Data
US 2012/0067865 A1 Mar. 22, 2012

(30) Foreign Application Priority Data

Mar. 13, 2009 (DE) .......................... 10 2009 013 127

(51) Int. Cl.
C03C 10/14 (2006.01)
C03C 10/12 (2006.01)
(Continued)

(52) U.S. Cl.
CPC ........... *C03C 10/0054* (2013.01); *C03C 10/009* (2013.01); *C03C 10/0027* (2013.01); *C03C 10/0045* (2013.01); *F24C 15/10* (2013.01)

(58) Field of Classification Search
CPC .. C03C 10/0009; C03C 10/0027; F24C 15/10
USPC .......................................................... 501/4, 7
See application file for complete search history.

(56) References Cited

U.S. PATENT DOCUMENTS 5,446,008 A * 8/1995 Krolla et al. .................... 501/68
5,492,869 A 2/1996 Beall et al.
(Continued)

FOREIGN PATENT DOCUMENTS

DE 19939787 2/2001
DE 102008050263 4/2010
(Continued)

OTHER PUBLICATIONS

Bach, H., "Low Thermal Expansion Glass Ceramics," Springer Publishing Co., Berlin Heidelberg, 1995, p. 66 (ISBN 3-540-58598-2).
(Continued)

Primary Examiner — Karl Group
(74) Attorney, Agent, or Firm — Ohlandt, Greeley, Ruggiero & Perle, LLP (57) ABSTRACT A transparent, dyed cooktop is provided that has improved color display capability. The cooktop is made of a glass ceramic having high quartz mixed crystals as the predominant crystal phase, wherein the glass ceramic comprises none of the chemical refining agents arsenic oxide and/or antimony oxide, except for inevitable trace amounts. The glass ceramic has transmission values of greater than 0.1% in the range of visible light over the entire wavelength range greater than 450 nm, light transmission in the visible range of 0.8 to 5%, and transmission in the infrared at 1600 nm of 45-85%. The glass ceramic also includes a display apparatus that has a display device which is designed to display different operating conditions with different colors and/or symbols.

20 Claims, 6 Drawing Sheets

Transmission spectra of the glass ceramics of Examples 18 and 19 as well as Comparative glass ceramic of Example 17

(51) Int. Cl.
*C03C 10/00* (2006.01)
*F24C 15/10* (2006.01)

(56) References Cited

U.S. PATENT DOCUMENTS

| | | | |
|---|---|---|---|
| 6,930,289 B2* | 8/2005 | Siebers et al. | 219/452.11 |
| 2005/0252503 A1 | 11/2005 | Siebers et al. | |
| 2006/0118102 A1* | 6/2006 | Wermbter et al. | 126/211 |
| 2007/0004578 A1 | 1/2007 | Monique Comte | |
| 2007/0232476 A1* | 10/2007 | Siebers et al. | 501/4 |
| 2008/0026927 A1 | 1/2008 | Monique Comte | |
| 2008/0099449 A1 | 5/2008 | England et al. | |
| 2012/0067865 A1* | 3/2012 | Siebers et al. | 219/445.1 |

FOREIGN PATENT DOCUMENTS

| | | |
|---|---|---|
| EP | 1465460 | 10/2004 |
| FR | 2837265 | 9/2003 |
| FR | 2887870 | 1/2007 |
| FR | 2908130 | 5/2008 |
| JP | 11100229 | 4/1999 |
| JP | 11100230 | 4/1999 |

OTHER PUBLICATIONS

Bach, H., et al., "Low Thermal Expansion Glass Ceramics," Springer Publishing Co., Berlin Heidelberg, 2005, p. 3 (ISBN 3-540-24111-6).
Hoeland, W., et al., "Glass-Ceramic Technology," The American Ceramic Society, Westerville, OH, 2002, p. 92.
International Preliminary Report on Patentability dated Sep. 29, 2011 corresponding to International Patent Application No. PCT /EP2010/051162.
Written Opinion of the International Search Authority dated Sep. 20, 2011 in corresponding International Application No. PCT/EP2010/051162.
International Preliminary Report on Patentability of the International Search Authority dated Sep. 20, 2011 in corresponding International Application No. PCT/EP2010/051162.
International Search Report from PCT/EP2010/051162, dated May 5, 2010.

* cited by examiner

Fig. 1: Measurement of pO2 as a function of temperature and determination of the temperature of the equilibrium oxygen partial pressure T (pO2 = 1 bar) on the example of Glass 9

Fig. 2: Transmission spectra of the glass ceramics of Examples 18 and 19 as well as Comparative glass ceramic of Example 17

TRANSPARENT, DYED COOKTOP

CROSS REFERENCE TO RELATED APPLICATIONS

This application is a U.S. National Stage Entry under 35 U.S.C. §371 of PCT/EP2010/051162, filed on Feb. 1, 2010, which claims the benefit of German Patent Application No. 10 2009 013 127.2, filed on Mar. 13, 2009.

BACKGROUND OF THE INVENTION

1. Field of the Invention

The invention relates to a transparent, dyed cooktop comprising a glass ceramic having high quartz mixed crystals as the predominant crystal phase as well as a method for the production thereof.

2. Description of Related Art

Cooktops having a glass-ceramic plate as a cooking surface are familiar prior art. Such glass-ceramic plates are usually present as flat plates or are shaped three-dimensionally.

Glass ceramics having high quartz mixed crystals as the predominant crystal phase are produced from crystallizable lithium aluminum silicate glasses.

These glass ceramics are produced in several steps.

In the large-scale production of glass ceramics, first the crystallizable initial glass of a mixture of shards and powder-form raw materials is melted at temperatures usually between 1500 and 1650° C. Typically, arsenic oxide and/or antimony oxide is used as the refining agent in the melt. These refining agents are compatible with the required glass-ceramic properties and lead to good bubble qualities of the melt. Although these materials are firmly bound in the glass structure, they are a disadvantage, however, from the aspects of safety and environmental protection. Special precautions must be implemented in producing and processing raw materials due to evaporation in the melts.

Recently, the use of $SnO_2$ is described in particular as an unobjectionable refining agent. In order to obtain good bubble qualities, in addition to $SnO_2$, halide compounds are preferably used as additional refining agents at conventional melting temperatures (maximum of approximately 1680° C.). Thus, in the Japanese Applications JP 11 100 229 A and JP 11 100 230 A, the use of 0.1-2 wt. % $SnO_2$ and 0-1 wt. % Cl has been described. According to these publications, coloring is obtained by the addition of $V_2O_5$ as a single coloring agent.

The addition of 0.05-1 wt. % fluorine (US 2007 0004578 A1) and 0.01-1 wt.-% bromine (US 2008 0026927 A1) for supporting the refining with $SnO_2$ is also disclosed. Refining temperatures below 1700° C. are also described in these publications. The main coloring agent is $V_2O_5$. The addition of halides is a disadvantage, since they evaporate intensely at the melting temperature and thus form toxic compounds, such as HF, for example.

The use of $SnO_2$ in combination with high-temperature refining above 1700° C. in order to obtain good bubble qualities is described in DE 199 39 787 C2. This step, however, provides no hint with respect to obtaining good display capability in the wavelength range starting from 450 nm.

After melting and refining, the glass usually undergoes a hot forming by rolling or recently by floating, in order to produce plates. For an economical production, on the one hand, a low melting temperature and a low processing temperature PR are desired, while on the other hand, the glass should not show any devitrification during the shaping. This means that disruptive crystals that adversely affect strength in the initial glasses and in the glass ceramics produced therefrom must not be formed. Since the shaping takes place in the vicinity of the processing temperature PR (viscosity $10^4$ dPas) of the glass, it must be assured that the upper devitrification temperature of the melt lies in the vicinity of and more favorably below the processing temperature, in order to avoid the formation of disruptive crystals.

Subsequently, the initial glass is converted to the glass-ceramic article by controlled crystallization. This ceramicizing is produced in a two-step temperature process, in which seeds are produced first, usually from $ZrO_2/TiO_2$ mixed crystals, by nucleation at a temperature between 680 and 800° C. $SnO_2$ may also participate in the nucleation. With a subsequent temperature increase, the high quartz mixed crystals grow on these seeds. High rates of crystal growth, which are desired for an economical, rapid ceramicizing, are obtained at temperatures of 850 to 950° C. At this maximum production temperature, the structure of the glass ceramic is homogenized and the optical, physical and chemical properties of the glass ceramic are adjusted. If desired, the high quartz mixed crystals can still be converted subsequently into keatite mixed crystals. The transformation into keatite mixed crystals is produced with a temperature increase to a range of approximately. 950 to 1200° C. With the conversion of high quartz to keatite mixed crystals, the thermal expansion coefficient of the glass ceramic increases and the transparency is reduced due to the light scatter accompanying the enlargement of the crystals. As a rule, glass ceramics having keatite mixed crystals as the main phase are thus translucent or opaque and the light scatter associated therewith acts negatively on display capability.

A key property of glass ceramics having high quartz mixed crystals as the main crystal phase is the ability to produce materials that provide an extremely low heat expansion coefficient of $<0.5 \times 10^{-6}$/K in the range of room temperature to 700° C. and above. Based on the low thermal expansion, these glass ceramics possess an excellent strength at different temperatures, and an excellent stability with temperature changes.

With application as cooktops, based on the requirements from practical use, technical development leads to very specific, partially contradictory requirements for transmission.

SUMMARY OF THE INVENTION

In order to prevent an interfering view through the cooktop onto the technical components under the glass-ceramic cooktop and in order to avoid the glare due to radiant heating, in particular, for bright halogen heating units, the light transmission of glass-ceramic cooktops is limited. On the other hand, during operation, even at relatively low power, the radiant heating unit should be well recognizable, in order to exclude any danger of burning. If such cooktops are turned off, however, the cooling of the heating elements after glowing would no longer be visible, although considerable heat is still present due to the heat capacity of the materials present and used, this heat being sufficient to cause serious burns. Also a certain light-transmission is necessary for display capability, since the usual red light diodes are incorporated underneath the cooktop. In order to satisfy these requirements, glass-ceramic cooktops are usually adjusted to light transmission values of 0.5 to 2.5%. This is achieved by additions of coloring elements. Glass-ceramic cooktops then appear to be black when viewed from the top, independent of the coloring element used, due to the low light transmission, while with transparency, they are mostly red, red-violet or orange-brown depending on the coloring elements used.

Color displays are composed of electronic components emitting light, for the most part light diodes, which are incorporated underneath the cooktop. They are desired for ease of operation as well as safe operation. Thus, for example, the current heating power or residual heat of the different cooking zones is optically displayed. An indication of residual heat is important for safer handling, if the heating units do not radiate or if it cannot generally be recognized that the cooktop is hot, as in the case of inductively heated cooktops. The usual red light diodes radiate at wavelengths of about 630 nm. In order to improve ease of operation and technical functions, however, and also to open up possibilities for household appliance manufacturers to differentiate their designs, in addition to the usual red display, displays of other colors are also desired.

Cooktops of Japanese origin are known, in which an LCD display is present that can be back-lighted green, orange and red.

With the exception of the color red, the most varied colors that are used for these cooktops today exclusively serve esthetic purposes. The color red, however, usually always indicates danger.

Information relevant to safety is coded and known only via display elements or symbols of the same color in seven segment displays. In critical safety situations, the user is forced to think of what the display wants to indicate to him. Added to this is the fact that a flood of information confronts the user due to the high level of technology in kitchens and the multitude of appliances in the kitchen, such as cooking stoves, ovens, microwaves, grills, exhaust hoods, refrigerators, freezers and bread slicing machines, etc., and the information differs from one appliance to another. For example, a red blinking light in one appliance may mean danger, while in another appliance it indicates an operation.

Further, a user cannot recognize by means of colors the operating state and malfunction conditions, i.e., whether the appliance is ready to operate and whether there is a hint of a possible malfunction.

A transmission of 45-85% in the infrared is desired for the cooktop.

A high transmission in the infrared is advantageous, since the radiation impinges directly on the bottom of the pot, is absorbed there, and thus a more rapid cooking is achieved. In the case of too high a transmission, the environment of the cooktop can be heated too intensely in the case of erroneous operation, e.g., in the free radiant cooking zone, due to a pot that has shifted.

An earlier type of glass-ceramic cooktop, known under the name Ceran Color®, produced by SCHOTT AG, possessed a good color display capability. Ceran Color® is colored by additions of NiO, CoO, $Fe_2O_3$ and MnO and refined by $Sb_2O_3$. A light transmission typically of 1.2% is adjusted for cooktops with a usual thickness of 4 mm by this combination of coloring oxides. The transmission in the region of 380 nm to 500 nm amounts to 0.1-2.8%, in each case depending on the wavelength. In the case of a wavelength of 630 nm, which is common for red light diodes, the transmission amounts to approximately 6%. It is a disadvantage in this earlier type of glass-ceramic cooktop that the coloring oxides used also absorb very strongly in the infrared. The IR transmission at 1600 nm amounts to less than 20%. Therefore, the cooking rate is reduced. The transmission curve of Ceran Color® is illustrated on page 66 in the book, "Low Thermal Expansion Glass Ceramics", editor Hans Bach, Springer Publishing Co., Berlin Heidelberg 1995 (ISBN 3-540-58598-2). The composition is listed in Tables 2-7 in the book "Glass-Ceramic Technology", Wolfram Höland and George Beall, The American Ceramic Society 2002.

In newer, further developed glass-ceramic cooktops, for the most part $V_2O_5$ is used for coloring, since it has the special property of absorbing in the region of visible light and permitting a high transmission in the region of infrared radiation.

Coloring by $V_2O_5$ represents a very complex process. As was shown in earlier investigations (DE 19939787 C2), a redox process is a prerequisite for the conversion of vanadium oxide into the coloring state. In the crystallizable initial glass, $V_2O_5$ is still a relatively weak dye and produces a slightly greenish shade of color. The redox process takes place in the ceramicizing, the vanadium is reduced and the redox partner is oxidized. The refining agent functions as the primary redox partner. The compositions refined by Sb and Sn were shown by Mossbauer investigations. In the ceramicizing, a part of the $Sb^{3+}$ or $Sn^{2+}$ in the initial glass is converted into the higher oxidation state $Sb^{5+}$ or $Sn^{4+}$. It can be assumed that the vanadium in the reduced oxidation state is incorporated as $V^{4+}$ or $V^{3+}$ in the seed crystal and is intensively colored therein by electron charge transfer reactions. $TiO_2$ can also intensify the coloring by vanadium oxide as another redox partner. In addition to the type and quantity of the redox partner in the initial glass, the redox state that is adjusted in the glass in the melt also has an effect. A lower oxygen partial pressure $pO_2$ (reducing adjusted melt), e.g., due to high melting temperatures, reinforces the coloring effect of the vanadium oxide.

The ceramicizing conditions have a further influence on the coloring effect of vanadium oxide. In particular, high ceramicizing temperatures and longer ceramicizing times lead to a more intense coloring.

In coloring by $V_2O_5$, the person skilled in the art will utilize the described relationships in order to adjust the desired transmission curve by means of a specific glass composition, specific redox adjustments of the $pO_2$ in the melt and the ceramicizing conditions. It has previously not been possible, however, to achieve all requirements such as light transmission according to specifications, high IR transmission, as well as display capability for standard red light diodes together with the desired improved display capability for luminous display by other colors.

The form of the absorption bands of the vanadium oxide and thus transmission in the region of visible light in the entire wavelength region greater than 450 nm up to the upper limit of 750 nm could not be adapted to allow higher transmissions.

Examples of such $V_2O_5$-colored glass-ceramic cooktops are $Sb_2O_3$-refined Ceran Hightrans® and $SnO_2$-refined Ceran Suprema®, which are produced by the company SCHOTT AG. The transmission curves of these two glass ceramics are published on page 63 in the book "Low Thermal Expansion Glass Ceramics", Second Edition, editors Hans Bach, Dieter Krause, Springer Publishing Co. Berlin Heidelberg 2005 (ISBN 3-540-24111-6).

In the named glass-ceramic cooktops and in other glass-ceramic cooktops found on the market, the transmission value of 0.1% is not reached in the wavelengths of about 450-550 nm that are important for the visibility of color, in particular, blue and green displays. Other essential requirements for transmission are fulfilled by these glass-ceramic cooktops: high infrared transmission for high cooking rates, transmission in compliance with specifications for standard red light diodes at approximately 630 nm and a light transmission of about 1.5%.

In order to eliminate this disadvantage, the European Patent Application EP 1465460 A2 discloses a glass-ceramic cooktop, which possesses a Y value (brightness) of 2.5-15, measured in the CIE color system with standard light C, for a thickness of 3 mm. The terms "brightness" and light transmission correspond to the same measured quantities. The Y value is identical to the value of light transmission measured according to DIN 5033. Improved displays for blue and green light diodes are obtained with this light transmission. The disclosed compositions are refined with $As_2O_3$ and/or $Sb_2O_3$, partially in combination with $SnO_2$. The coloring is carried out by $V_2O_5$.

In the comparative example, it is shown that with a light transmission of 1.9%, the display capability for blue and green light diodes having the listed material compositions is insufficient.

The values of light transmission of at least 2.5% and preferably higher are a disadvantage however, with respect to masking the electronic components underneath the cooktop. Also, the esthetic black appearance of the cooktop when viewed from the top is adversely affected.

The problem of the invention is to provide a cooktop of the type mentioned initially, which has an improved display capability, so that a user can clearly and intuitively recognize dangerous situations.

The cooktops of the invention should satisfy all other requirements that are established for cooktops, such as, e.g.: chemical stability, temperature stability and high-temperature/time stability with respect to changes in their properties (such as, e.g., thermal expansion, transmission, buildup of stresses).

It is also a problem of the invention to provide a method for displaying an operating state of a cooktop, which makes possible recognizing dangers.

These problems are solved by a cooktop and by a method disclosed herein.

The dyed cooktops provide transmission values of more than 0.1% in the region of visible light in the entire wavelength region greater than 450 nm, a light transmission in the visible region of 0.8-5% (preferably 0.8-2.5%) and a transmission in the infrared at 1600 nm of 45-85%.

Due to the light transmission of 0.8-2.5% according to the invention in the visible region, it is assured that the disruptive view onto the technical components under the glass-ceramic cooktop is prevented and the esthetic black appearance when viewed from the top is assured. Radiant heating units are visible in operation and the usual red light diode displays can be well recognized. Displays of other colors also can be well recognized due to the transmission of more than 0.1% in the region of visible light in the overall wavelength region above 450 nm. In view of the luminous intensity of commercial blue, green, yellow or orange light diodes, this transmission value is sufficient and represents a clear improvement when compared with the prior art. In particular, displays with blue and green colors are clearly improved. Displays with white light are less falsified in their color due to the transmission curve in the entire wavelength region greater than 450 nm.

Thus, according to the invention, colored and particularly multicolored displays can be provided for the cooktop, whereby the display elements shine their light from the back side of the cooktop and this light is then correspondingly perceived on the front side by the observer. The transmission properties of the cooktop thus make possible a clear presentation of different heating states and/or malfunction conditions.

In order to indicate different heating states, a display that conveys a red, orange or blue perceived color depending on heat can be especially used according to the invention. In this case, the red color stands for hot, orange color for warm and blue color for cold. For example, the display possesses a luminous red field, optionally a luminous orange field and optionally a luminous blue field, which are particularly formed from LEDs. In addition, it is also possible to provide a luminous field in which a color change occurs continually as a gradient within a single field or along different color fields or segments.

It is common to both embodiments that an operator, without needing to know about the operating field or having to consider the meaning that a display may have, intuitively recognizes the heating state of the appliance via the color coding. These color displays that indicate the temperature state stepwise or continuously and are correlated with the heat, can be disposed alongside each individual cooking or heating field or adjacent to a corresponding actuating switch or in an extra display field of the cooktop.

According to the invention, these types of color fields, which provide either different individual color fields or a single color field, indicate malfunction conditions. In this case, the color curve from red via yellow to green can be produced, particularly in a discrete manner, i.e., stepped from red to yellow to green. In this case, red indicates a safety-critical malfunction condition or operating state, yellow a malfunction condition that is not critical to safety, and green indicates an unlimited ready-to-operate state.

This means that the user is informed by color symbols that are familiar to him from daily life (red-blue=fire-water; red-yellow-green=traffic light colors). This permits him to rapidly and reliably determine the operating state of the appliance. In this case, it is of advantage that a clear increase is achieved in application safety, ergonomics, and confidence in the appliance, and particularly in a cooktop.

Below 350 nm in the ultraviolet region, the lower transmission values of clearly less than 0.01% in the known glass-ceramic cooktops are also assured with the cooktop of the invention. The blocking of UV light is advantageous for protecting organic components, such as, e.g., adhesives in the technical fittings under the cooktop, as well as protection during cooking, if blue light diodes with an ultraviolet radiation component are used for the display.

Due to the adjusted infrared transmission of 45-85%, measured at 1600 nm, the requirements for a high cooking rate and protection from impermissible heating of the surroundings of the cooktop are achieved. Since the values for transmission and light transmission are important for the function of the cooktop, they are valid independent of the thickness of the cooktop, which usually is between 2.5 and 6 mm. Thicknesses that are less than that are a disadvantage with respect to strength, and thicker cooktops are not economical since they require more material and reduce the rate of ceramicizing. For the most part, the thickness of the cooktop is approximately 4 mm. Unless stated otherwise, the indicated transmission values refer to this thickness for both commercial cooktops and the examples of embodiment. If the cooktop is produced by shaping with rollers, the underside is usually provided with roughness elements in order to protect it from strength-lowering lacerations during production. Often, the underside of the cooktop is smoothed with transparent organic polymers in the region of the color displays, in order to avoid an optical distortion due to the roughness elements. In cooktops with a smooth underside without roughness elements, color displays are undistorted and can be perceived as bright.

In order to reliably fulfill the requirements for temperature resistance, the cooktops according to the invention provide low heat expansion coefficients of less than $1 \cdot 10^{-6}$/K, preferably $(0 \pm 0.3) \cdot 10^{-6}$/K.

The transparent, dyed cooktops according to the invention are thus characterized by a composition that does not use arsenic oxide and/or antimony oxide as refining agents and are thus technically free of these components that are detrimental for reasons of safety and environmental protection. As impurities, these components are usually present in contents of less than 500 ppm.

The method according to the invention for producing a transparent, dyed cooktop with improved color display capability is characterized in that it forms a glass ceramic having high quartz mixed crystal as the predominant crystal phase and in that, except for unavoidable traces, it dispenses with the chemical refining agents arsenic oxide and/or antimony oxide and the cooktop is adjusted to transmission values of greater than 0.1% in the region of visible light in the entire wavelength region greater than 450 nm, to a light transmission in the visible region of 0.8 to 2.5%, and to a transmission in the infrared at 1600 nm from 45 to 85%.

In order to be able to improve the bubble quality, in addition to the $SnO_2$ used, other refining additions, such as e.g., $CeO_2$, sulfate compounds, halide compounds are used. Their contents are usually limited to quantities of up to 1 wt. %. In the production of cooktops, those with bubble counts of less than 10, preferably less than 5 bubbles/kg of glass (referred to bubble sizes greater than 0.1 mm) are desired as good bubble qualities.

Preferably, the transmission of the cooktop is adjusted to values of
>0.15% at 450 nm
>0.15% at 500 nm
>0.25% at 550 nm
3-9% at 630 nm
50-80% at 1600 nm
and a light transmission in the visible region of 1.0-2.0%.

With these values, the color display capability is further improved and the different requirements for the transmission curve are further optimized. Another improved masking of the technical fittings underneath the glass-ceramic cooktop and a particularly esthetic black appearance is achieved in reflected light if the light transmission is less than 1.7%. Transmission values of 3 to 9% at 630 nm for the cooktop correspond to the tolerance values of commercial cooktops. It is advantageous to adjust the transmission to these values and thus the appearance of the conventional red LED displays is also unchanged with the cooktop of the invention.

Display capability is further improved if the transmission of the cooktop is adjusted to the following values in the preferred embodiment
>0.10% at 400 nm
>0.15% at 450 nm
>0.25% at 500 nm
>0.30% at 550 nm
3-9% at 630 nm
50-80% at 1600 nm
and a light transmission in the visible region of 1.0-1.7%.

The cooktop according to the invention preferably has a glass-ceramic composition that essentially comprises the following in wt. % based on oxide:

| | |
|---|---|
| $Li_2O$ | 3.0-4.2 |
| $\Sigma Na_2O + K_2O$ | 0.2-1.5 |
| MgO | 0-1.5 |
| $\Sigma CaO + SrO + BaO$ | 0-4 |
| ZnO | 0-2 |
| $B_2O_3$ | 0-2 |
| $Al_2O_3$ | 19-23 |
| $SiO_2$ | 60-69 |
| $TiO_2$ | 2.5-4 |
| $ZrO_2$ | 0.5-2 |
| $P_2O_5$ | 0-3 |
| $SnO_2$ | 0.1-<0.6 |

-continued

| | |
|---|---|
| $\Sigma TiO_2 + ZrO_2 + SnO_2$ | 3.8-6 |
| $V_2O_5$ | 0.01-0.06 |
| $Fe_2O_3$ | 0.03-0.2, |
| with the condition that: $1 < Fe_2O_3/V_2O_5 < 8$. | |

The phrase "essentially comprises" means that the listed components should amount to at least 96%, and usually 98%, of the total composition. A plurality of elements such as, e.g., F, Cl, the alkalis Rb, Cs or elements such as Hf are common impurities when large-scale quantities of raw materials are used. Other compounds such as, e.g., those of the elements Ge, rare earths, Bi, W, Nb, Ta, Y may be added in small proportions.

In addition to the coloring oxide $V_2O_5$ in contents of 0.01 to 0.06 wt. %, other coloring components such as, e.g., compounds of chromium, manganese, cobalt, nickel, copper, selenium, rare earths, and molybdenum may also be used in order to support the coloring. Their content is limited to quantities of a maximum of approximately 1 wt. %, since these compounds usually decrease the transmission in the infrared region. In addition, these compounds, which are polyvalent for the most part, may disrupt the coloring by $V_2O_5$ due to redox reactions and make difficult the adjustment of the transmission according to the invention.

It is possible to label the glass-ceramic cooktop by addition of 50-400 ppm of $Nd_2O_3$. The absorption band of Nd in the near infrared at 806 nm lies in a region of high transmission values of the glass ceramic and is thus striking in the transmission spectrum. In this way, the cooktop material can be reliably supplied to the manufacturer and a good recycling is possible with optical shard detection methods.

The water content of the initial glasses for the production of the cooktops according to the invention usually lies between 0.015 and 0.06 mol/l, depending on the selection of raw material mixtures and process conditions in the melt. This corresponds to β—OH values of 0.16 to 0.64 $mm^{-1}$ for the initial glasses.

The oxides $Li_2O$, $Al_2O_3$ and $SiO_2$ in the preferred, indicated limits are necessary components of the high quartz mixed crystals. A minimum content of $Li_2O$ of 3 wt. % is necessary, but $Li_2O$ contents of more than 4.2 wt. % in a manufacturing process frequently lead to an unwanted devitrification. A content of 3.2 to 4.0 wt. % leads to particularly good results.

In order to avoid high viscosities of the initial glass and in order to suppress the tendency of an undesired devitrification of mullite in the shaping process, the $Al_2O_3$ content is limited preferably to a maximum of 23 wt. %, particularly 22 wt. %. The $SiO_2$ content shall amount to a maximum of 69 wt. %, since this component greatly increases the viscosity of the glass. Preferably, this component is further limited to values of a maximum of 68 and further to a maximum of 67 wt. %. Higher contents of $SiO_2$ are not economical for a good melting of the glasses and for low shaping temperatures. The minimum content of $SiO_2$ should amount to 60 wt. %, in particular 62 wt. %, since this is advantageous for the required cooktop properties, such as, e.g., chemical stability and temperature resistance.

MgO, ZnO and $P_2O_5$ can be incorporated in the high quartz mixed crystals as additional components. The ZnO content is limited to values of 2.0 wt. % at most, preferably 1.8 wt. % at most, due to the problem of the formation of undesired crystal phases such as zinc spinel (gahnite) in the ceramicizing. The MgO content is limited to a maximum of 1.5 wt. %, preferably 1.2 wt. %, since otherwise it impermissibly increases the expansion coefficient of the glass ceramic. A minimum MgO content of 0.1 wt. % is usually required so that the thermal expansion of the glass ceramic does not fall to negative values.

The addition of the alkalis $Na_2O$, $K_2O$ and the alkaline earths CaO, SrO, BaO as well as of $B_2O_3$ improves the melting capability and the devitrification stability when the glass is shaped. The contents, however, must be limited, since these components are not incorporated in the crystal phases, but essentially in the residual glass phase of the glass ceramic.

Contents that are too high increase the thermal expansion of the glass ceramic in an impermissible manner and adversely affect the crystallization properties in the conversion of the crystallizable initial glass into the glass ceramic, particularly here for loads with rapid rate of ceramicizing. Higher contents also unfavorably affect the time/temperature resistance of the glass ceramic. The sum of the alkalis $Na_2O+K_2O$ should be at least 0.2, preferably at least 0.4 wt. % and a maximum of 1.5 wt. %, preferably a maximum of 1.2 wt. %.

The sum of the alkaline earths $CaO+SrO+BaO$ should be a maximum of 4 wt. %, preferably at least 0.2 wt. %.

The named alkalis and alkaline earths are concentrated on the surface of the glass ceramic in addition to in between the crystals in the residual glass phase. During ceramicizing, an approximately 200 to 1000 nm thick glassy surface layer forms, which is nearly free of crystals and which is enriched with these elements and enriched with lithium. This glassy surface layer acts favorably on the chemical stability of the glass ceramic.

The addition of $P_2O_5$ can amount to up to 3 wt. % but is preferably limited to 1.5%. The addition of $P_2O_5$ is favorable for devitrification resistance. Higher contents act unfavorably on acid resistance.

$TiO_2$, $ZrO_2$ and $SnO_2$ are necessary as nucleation agents. During ceramicizing, they form seeds in high density during the nucleation, these seeds serving as bases for the growth of the high quartz mixed crystals during crystallization. Contents higher than 6 wt. % for the total sum adversely affect devitrification resistance. This applies particularly to the component $SnO_2$, which is limited to values of less than 0.6 wt. %. Higher contents lead to the crystallization of Sn-containing crystal phases on contact materials (e.g. Pt/Rh) during the shaping and must be absolutely avoided.

The $ZrO_2$ content is limited to 2 wt, %, preferably 1.8 wt. % and more preferably to a maximum of 1.6 wt. %, since higher contents adversely affect the melting behavior of the mixture during glass production, and devitrification resistance during the shaping can be adversely affected by the formation of $ZrO_2$-containing crystals. The minimum content of $ZrO_2$ should amount to 0.5 wt. % and preferably 0.8 wt. % in order to promote a high rate of ceramicizing. The $TiO_2$ content lies between 2.5 and 4.0 wt. %, preferably at least 2.8 wt. %. The minimum quantity must be present so that a rapid nucleation is assured for achieving high rates of ceramicizing. The content should not exceed 4 wt. %, since otherwise devitrification resistance would be adversely affected.

It has now been found surprisingly that $Fe_2O_3$ contents starting from 600 ppm, preferably from 700 ppm, in combination with narrowly specified contents of $TiO_2$, $V_2O_5$ and $SnO_2$ can influence the transmission curve. Since $Fe_2O_3$, especially the proportion of divalent $Fe^{2+}$, acts negatively on IR transmission, the $Fe_2O_3$ content should be a maximum of 0.2 and preferably a maximum of 0.18 wt. %. Particularly preferred is an $Fe_2O_3$ content of 0.08-0.15 wt. %

The combination of the coloring oxide $Fe_2O_3$ with $V_2O_5$ and its redox partner $SnO_2$ permits getting by with smaller amounts of the costly coloring agent $V_2O_5$, which is classified as a hazardous substance. In this way, the requirements for transmission at lower wavelengths starting from 450 nm and the other requirements such as light transmission, infrared transmission, as well as transmission at 630 nm can be maintained according to specifications. The transmission curve is flatter in the region of visible light, when compared with the known glass ceramics colored with vanadium oxide. In order to reduce the content of the expensive coloring agent $V_2O_5$, which is also objectionable as a hazardous substance, it is indispensable that the $Fe_2O_3$ content must be at least as high as the $V_2O_5$ content and thus the following condition must be satisfied:

$$1 < Fe_2O_3/V_2O_5 < 8.$$

The coloring oxide $Fe_2O_3$ is thus quantitatively the main coloring agent and preferably the content is double that of the $V_2O_5$. In this way it is also possible to utilize more cost-effective mixtures of raw materials.

Other components that contribute to reducing the required $V_2O_5$ content are $SnO_2$ and $TiO_2$. In order to adjust the transmission according to the invention, it is thus necessary to adjust $V_2O_5$, $SnO_2$, $TiO_2$ and $Fe_2O_3$ within specific narrow limits. In particular, the $TiO_2$ content must exceed a certain minimum quantity.

With the $Fe_2O_3$, $TiO_2$, $V_2O_5$ and $SnO_2$ contents according to the invention, it is possible to obtain all the requirements for the transmission curve, such as light transmission, high infrared transmission, as well as display capability according to specifications for standard red light diodes, together with the desired improved display capability for light displays of other colors.

As another important result of the addition of $Fe_2O_3$, it was found that it essentially supports the refining. In combination with $SnO_2$ as the primary refining agent, $Fe_2O_3$ also yields oxygen and is thus reduced to $Fe^{2+}$. The substantial conversion for the refining effect increases with the temperature of the melt. A temperature treatment of the melt at higher than 1700° C. and further, higher than 1750° C., thus supplies further improved results with respect to the bubble quality. Thus, since the addition of $Fe_2O_3$ as an additional refining agent acts in a particularly advantageous manner in combination with $SnO_2$, the content should amount to at least 20% of the $SnO_2$ content.

For an economical production, a rapid ceramicizing capability of the initial glass is desired. It is necessary in this case to increase the rate of nucleation and ceramicizing by an appropriately selected composition. It has proven advantageous here to increase the contents of the nucleation agents $TiO_2+ZrO_2+SnO_2$, in order to raise the rate of nucleation, while the content of $P_2O_5$ must be selected at lower values.

In addition, distortions of the cooktops that occur during the ceramicizing are a limiting factor. Large-scale ceramicizing ovens have a certain temperature inhomogeneity and thus it is difficult to adjust the temperature of the upper and lower sides of the crystallizable glass in a fully uniform manner during the crystallization. Small temperature differences of a few ° C. lead to premature crystallization on the plate side having the higher temperature. This then leads to distortions, combined with the linear crystallization shrinkage of approximately 1%. Commercial cooktops are usually specified to have a distortion of less than 0.1% of their diagonal dimension.

In order to minimize this distortion in the case of a rapid ceramicizing program, it has proven favorable to minimize the proportion of components forming the crystal phase, such as $Li_2O$, $SiO_2$, and to increase the proportion of components that form the residual glass phase of glass ceramics, such as the alkalis $Na_2O$ and $K_2O$ as well as the alkaline earths CaO, SrO, BaO. The proportion of the high quartz mixed crystal phase advantageously amounts to less than 70 wt. % and lies at 60 to 70 wt. %. During the ceramicizing, the glass-ceramic plate is found on a planar base plate. Due to the increased proportion of the residual glass phase and the reduction of the crystal phase fraction, distortions that arise are reduced at high temperatures due to viscous flow by setting the glass-ceramic plate onto the planar base.

Relative to the rapid ceramicizing capability of the initial glass, the cooktop according to the invention preferably has a glass-ceramic composition that essentially comprises the following in wt. % based on oxide:

| | |
|---|---|
| $Li_2O$ | 3.2-4.2 |
| $Na_2O$ | 0.1-1 |
| $K_2O$ | 0.1-1 |
| $\Sigma Na_2O + K_2O$ | 0.2-1.5 |
| MgO | 0-1.5 |
| $\Sigma CaO + SrO + BaO$ | 0.1-4 |
| ZnO | 0-2 |
| $B_2O_3$ | 0-1 |
| $Al_2O_3$ | 19-23 |
| $SiO_2$ | 60-68 |
| $TiO_2$ | 2.8-4 |
| $ZrO_2$ | 0.8-1.8 |
| $P_2O_5$ | 0-1.5 |
| $SnO_2$ | 0.1-<0.6 |
| $\Sigma TiO_2 + ZrO_2 + SnO_2$ | 4.4-6 |
| $V_2O_5$ | 0.01-0.05 |
| $Fe_2O_3$ | 0.07-0.18, |
| with the condition that: $2 < Fe_2O_3/V_2O_5 < 6$. | |

A rapid ceramicizing capability is understood to be a thermal treatment for the crystallization of glass ceramics having a duration of less than 2 hours, preferably less than 80 minutes.

In the method for ceramicizing according to the invention, the thermally unstressed, crystallizable initial glass is heated to the temperature region of approximately 680° C. within 3-30 min. The necessary high heating rates can be conducted in roller furnaces in large-scale production. This temperature region of approximately 680° C. corresponds to approximately the transformation temperature of the glass. Above this temperature, up to approximately 800° C. is the region with high nucleation rates. The passage through the temperature region for nucleation lasts over a time period of 10 to 30 minutes.

After this, the temperature of the glass containing crystallization seeds is increased within 5 to 30 minutes to a temperature of 850 to 950° C., which is characterized by high rates of crystal growth of the high quartz mixed crystal phase. This maximum temperature is maintained for up to 20 minutes. In this case, the structure of the glass ceramic is homogenized and the optical, physical and chemical properties are adjusted. The obtained glass ceramic is cooled to 800° C. at cooling rates of approximately 10° C./min and rapidly after that to room temperature.

Mixtures of raw materials, such as, e.g., barium nitrate or barium chloride, which are used as the source for BaO, are a disadvantage from the viewpoint of the environment and require special precautions in their use. In addition, BaO increases the density of the glass ceramic and thus the weight of the cooktop. In order to reduce the BaO content or to completely eliminate it except for impurities, it has proven favorable to substitute BaO by the chemically related alkaline earths CaO and SrO. In this case, the content of CaO amounts to 0.2 to 1 wt. % and the content of SrO amounts to 0.1 to 1 wt. %.

For an economical production, the crystallizable initial glass should be well meltable and provide a high devitrification resistance. The processing temperature should be less than 1320° C. in this case and preferably less than 1310° C. The upper devitrification limit should be at least 30° C., preferably at least 50° C., below the processing temperature. With respect to the devitrification, critical crystal phases are mullite (aluminum silicate), baddeleyite ($ZrO_2$) as well as $Li_2O$—$Al_2O_3$—$SiO_2$ mixed crystals and crystal phases containing $SnO_2$. With respect to devitrification resistance, higher contents of $Li_2O$, $Al_2O_3$, $SiO_2$, $ZrO_2$ and $SnO_2$ are accordingly disadvantageous. In order to reduce the viscosity of the glass melt, it has proven necessary to reduce the content of $SiO_2$, $Al_2O_3$, and $ZrO_2$, whereas higher contents of the alkalis $Na_2O+K_2O$ and alkaline earths $CaO+SrO+BaO$ are selected.

In this respect, a cooktop according to the invention possesses the following composition in wt. % based on oxide:

| | |
|---|---|
| $Li_2O$ | 3.2-4.0 |
| $Na_2O$ | 0.2-1 |
| $K_2O$ | 0.1-1 |
| $\Sigma Na_2O + K_2O$ | 0.4-1.2 |
| MgO | 0.1-1.2 |
| CaO | 0.2-1 |
| SrO | 0-1 |
| BaO | 0-3 |
| $\Sigma CaO + SrO + BaO$ | 0.2-4 |
| ZnO | 0-1.8 |
| $B_2O_3$ | 0-1 |
| $Al_2O_3$ | 19-22 |
| $SiO_2$ | 62-67 |
| $TiO_2$ | 2.8-4 |
| $ZrO_2$ | 0.5-1.6 |
| $P_2O_5$ | 0-1.5 |
| $SnO_2$ | 0.1-0.5 |
| $\Sigma TiO_2 + ZrO_2 + SnO_2$ | 4.2-6 |
| $V_2O_5$ | 0.01-0.05 |
| $Fe_2O_3$ | 0.08-0.15, |
| with the condition: $2 < Fe_2O_3/V_2O_5 < 6$. | |

It has been shown that targeted reducing conditions of the crystallizable initial glass, which are established in the melt, have a favorable effect on the desired transmission curve of the glass ceramic.

The named different requirements for transmission can then be better combined with one another. The equilibrium oxygen partial pressure $pO_2$ of 1 bar in this case should be obtained at a temperature of >1580° C., preferably of >1640° C. The higher this temperature is, the more the obtained glass is adjusted in a reducing manner, and the fractions with low valences such as, e.g., $Sn^{2+}$, $Fe^{2+}$, $Ti^{3+}$ are increased in the polyvalent components. This reinforces the coloring effect of the vanadium oxide.

In the case of the temperatures according to the invention for the equilibrium oxygen partial pressure $pO_2$, it is possible to adjust the transmission curve according to the invention with small $V_2O_5$ contents. Less than 0.04 wt. % and preferably less than 0.03 wt. % is required. Since vanadium is also a costly raw material, it is economically advantageous to minimize the content of $V_2O_5$.

This equilibrium oxygen partial pressure $pO_2$ can be adjusted in the melt by addition of reducing agents in powder and/or liquid form to the initial mixture. Metals, carbon and/or oxidizable carbon or metal compounds, such as, e.g., Al or Si powder, sugar, charcoal, SiC, TiC, MgS, ZnS are suitable for this purpose. Gaseous reducing agents such as, e.g., forming gas, are also suitable. The named reducing agents are suitable for decreasing the $pO_2$ of the melt and for adjusting the desired value for the equilibrium oxygen partial pressure.

A preferred possibility for adjusting the equilibrium oxygen partial pressure $pO_2$ is the temperature treatment of the glass melt at temperatures higher than 1700° C., preferably higher than 1750° C. This temperature treatment can be carried out advantageously as a high-temperature refining, which permits obtaining the desired low bubble counts of <10, preferably <5 bubbles/kg, in large-scale production. The refining effect is thus reinforced in this way, since $SnO_2$ is a refining agent which strongly yields the oxygen required for the refining at high temperatures above 1700° C.

This is true also for the additional refining agent $Fe_2O_3$. The combination of the two thus supplies further improved bubble qualities or permits higher glass throughput in large-scale melting vats. The amount of $Fe_2O_3$ for refining is significant with contents of at least 20 wt. % of the refining agent $SnO_2$ that is used. Thus one can combine the advantage of a good refining effect with the advantage according to the invention of adjusting the equilibrium oxygen partial pressure $pO_2$ to the preferred value. In this case, the mechanism is that at high temperatures, $O_2$ refining bubbles are formed, which rise in the glass melt and exit from it, whereby other dissolved foreign gases are also removed. At sufficient times, if all of the oxygen that is released from the melt in the refining is removed, the maximum temperature in the treatment is the temperature at which the equilibrium oxygen partial pressure $pO_2$ corresponds to the value of 1 bar. Since this equilibrium is not fully reached for large-scale glass melts and the throughputs used for reasons of time constraints, a certain quantity of oxygen refining bubbles always remains in the melt and is resorbed during the cooling. In addition, oxygen from the environment is also absorbed to a small extent when the melt is cooled from the maximum temperature to the forming temperature PR. For this reason, the measured temperature of the equilibrium oxygen partial pressure $pO_2$ of 1 bar does not correspond to the maximum temperature in the melt, but is lower than it. Then, reducing additives are added.

Preferably, one or more displays of another color, such as blue, green, yellow, orange or white is (are) disposed instead of or in addition to the usual red displays beneath the cooktop according to the invention having improved color display capability. The color displays are composed of electronic components emitting light, for the most part light diodes. The underside of the cooktop may possess the usual roughness elements or can be designed smooth.

In an advantageous enhancement of the invention, the user is supported by the use of symbols or text in the evaluation of the malfunction condition.

For example, a display field for the temperature state and a display field for a malfunction condition may be present on the cooking plate or in the cooktop, whereby each of these two fields is characterized by a clear symbol (heat=flame symbol, malfunction=warning symbol (triangle with exclamation point)). Further, particularly for users with defects in color vision, it is possible to also characterize the individual stages with symbols. Thus, for example, a temperature display field, which illuminates in the red, also provides a large flame in the display field. The corresponding orange display field provides a small flame and the blue field either provides no symbol or a symbol that symbolizes cold. When traffic light colors are used for display of malfunction conditions, for example, the little traffic guys known from pedestrian traffic lights (red=standing, green=walking) can be used. Of course, in addition to a color or a symbol, the displays can flash, and in particular can flash either more rapidly or more slowly or in different rhythms, depending on the degree of malfunction or temperature level.

The cooktop can be heated by radiant heaters, halogen heaters, induction heating or by gas. All forms of displays, localized displays as well as surface displays are possible.

In this case, the cooktop can be formed not only as a planar flat plate, but also three-dimensionally shaped cooktops, such as, e.g., bent, angled or curved plates can be used. The plates may be rectangular or may be present in other shapes, and may contain, in addition to planar regions, three-dimensionally shaped regions, such as, e.g., woks.

BRIEF DESCRIPTION OF THE DRAWINGS

The present invention will be further explained below on the basis of examples. Here is shown.

Table 1: Composition and properties of crystallizable initial glasses and comparative glasses and Table 2: Ceramicizing conditions and properties of glass ceramics according to the invention and comparative glass ceramics.

DETAILED DESCRIPTION OF THE INVENTION

Compositions and properties of the crystallizable initial glasses are listed in Table 1 for several embodiment examples. These involve glasses 1 to 12 as glasses according to the invention and glass 13, which is a comparative glass outside of the present invention, the composition of which corresponds to the commercial cooktop glass ceramic Ceran Suprema® of SCHOTT AG.

TABLE 1

Compositions and properties of inital glasses according to the invention and comparative glass 13

| Glass No. | 1 | 2 | 3 | 4 | 5 | 6 | 7 | 8 | 9 | 10 | 11 | 12 | 13 |
|---|---|---|---|---|---|---|---|---|---|---|---|---|---|
| Composition in wt. % based on oxide | | Same as Glass 1 | Same as glass 1 | | | | | Same as Glass 7 | | Same as Glass 9 | | | |
| $Al_2O_3$ | 20.8 | | | 20.9 | 21.0 | 20.90 | 21.7 | | 19.1 | | 21.0 | 20.9 | 21.2 |
| BaO | 2.19 | | | 2.26 | 0.97 | 1.48 | 1.01 | | 0.77 | | — | 2.30 | — |
| CaO | 0.44 | | | 0.46 | 0.40 | 0.40 | 0.13 | | 0.05 | | 0.5 | 0.42 | — |
| $K_2O$ | 0.24 | | | 0.20 | 0.25 | 0.30 | 0.22 | | 0.13 | | 0.4 | 0.22 | 0.15 |

TABLE 1-continued

Compositions and properties of inital glasses according to the invention and comparative glass 13

| Glass No. | | 1 | 2 | 3 | 4 | 5 | 6 | 7 | 8 | 9 | 10 | 11 | 12 | 13 |
|---|---|---|---|---|---|---|---|---|---|---|---|---|---|---|
| $Li_2O$ | | 3.61 | | | 3.64 | 3.52 | 3.48 | 3.73 | | 3.59 | | 3.7 | 3.71 | 3.8 |
| MgO | | 0.34 | | | 0.31 | 0.31 | 0.40 | 0.72 | | 1.16 | | 0.4 | 0.37 | 1.0 |
| $Na_2O$ | | 0.58 | | | 0.62 | 0.45 | 0.50 | 0.33 | | 0.14 | | 0.6 | 0.59 | 0.45 |
| $P_2O_5$ | | — | | | — | — | — | — | | — | | 0.6 | — | — |
| $SiO_2$ | | 65.2 | | | 64.9 | 66.70 | 66.10 | 65.3 | | 68.6 | | 65.8 | 65.14 | 67.2 |
| $SnO_2$ | | 0.24 | | | 0.24 | 0.24 | 0.24 | 0.27 | | 0.27 | | 0.26 | 0.24 | 0.2 |
| SrO | | 0.10 | | | — | — | — | — | | — | | 0.5 | — | — |
| $TiO_2$ | | 3.11 | | | 3.27 | 3.23 | 3.26 | 3.20 | | 2.58 | | 3.1 | 3.1 | 2.5 |
| ZnO | | 1.52 | | | 1.50 | 1.38 | 1.36 | 1.60 | | 1.51 | | 1.6 | 1.5 | 1.7 |
| $ZrO_2$ | | 1.38 | | | 1.37 | 1.26 | 1.31 | 1.48 | | 1.71 | | 1.35 | 1.34 | 1.7 |
| CoO | | — | | | 0.039 | 0.059 | 0.085 | 0.039 | | 0.04 | | | | — |
| $Fe_2O_3$ | | 0.12 | | | 0.12 | 0.15 | 0.15 | 0.12 | | 0.12 | | 0.09 | 0.085 | 0.03 |
| $MnO_2$ | | 0.020 | | | 0.028 | — | — | 0.028 | | 0.03 | | 0.02 | 0.025 | — |
| $Nd_2O$ | | 0.015 | | | | | | | | | | | | — |
| NiO | | — | | | 0.013 | — | — | 0.012 | | 0.012 | | | | — |
| $V_2O_5$ | | 0.024 | | | 0.024 | 0.037 | 0.042 | 0.025 | | 0.023 | | 0.027 | 0.025 | 0.06 |
| Additive mixture | wt. % | | | 1 (sugar) | | | | | | | | | | |
| Properties | | | | | | | | | | | | | | |
| Tg | ° C. | 673 | | | 686 | 679 | 678 | 671 | | 680 | | 672 | 670 | 674 |
| PR | ° C. | 1306 | | | 1303 | 1327 | 1318 | 1296 | | 1332 | | 1318 | 1305 | 1310 |
| Density | g/cm³ | 2.478 | | | 2.480 | 2.448 | 2.460 | 2.468 | | 2.443 | | 2.444 | 2.479 | 2.438 |
| Devitrication temperature, mp | ° C. | 1255 | | | 1260 | 1265 | 1265 | 1290 | | 1310 | | 1235 | 1235 | 1280 |
| $T(pO_2 = 1$ bar) | ° C. | 1643 | 1582 | 1798 | 1654 | 1608 | 1617 | 1664 | 1548 | 1696 | 1595 | 1564 | 1600 | 1569 |
| Maximum temp. Melt, | ° C. | 1850 | 1640 | 1640 | 1850 | 1640 | 1640 | 1850 | 1640 | 1850 | 1640 | 1640 | 1780 | 1640 |
| time | h | 1 | 2 | 2 | 1 | 2 | 2 | 1 | 2 | 1 | 2 | 2 | 0.25 | 2 |

Based on typical impurities in the mixtures of raw materials that are used in large-scale production, the compositions do not add up to exactly 100 wt. %. Typical impurities, even if they are not intentionally introduced into the composition are: F, Cl, B, P, Rb, Cs, Hf, which usually amount to less than 0.05 wt. %. They are often entrained via the raw materials for chemically related components, thus, e.g., Rb and Cs via Na or K raw materials, or Sr via the Ba raw material, and vice versa.

The water content of the glasses amounts to 0.03-0.05 mol/l, corresponding to β—OH values of 0.32 to 0.53 $mm^{-1}$.

The properties in the glassy sate, such as, e.g., transformation temperature Tg, processing temperature PR, devitrification temperature, as well as density are also listed in Table 1. In glasses of the same composition, in which the refining temperature was varied, these properties are the same.

In order to measure the devitrification temperature, the glasses are melted in Pt/Rh10 crucibles. Subsequently, the crucibles are kept for 5 hours at different temperatures in the region of the processing temperature PR. The highest temperature at which the first crystals appear on the contact surface of the glass melt with the crucible walls determines the devitrification temperature.

In addition, the maximum temperature of the melt and the time associated with it, as well as the measured temperature at which the $pO_2$ reaches the value of 1 bar are given in Table 1. The $pO_2$ measurement was carried out in the known way on the re-melted glasses as a function of temperature, and the temperature was determined for the equilibrium oxygen partial pressure $pO_2$=1 bar. In the case of $pO_2$ measurements, $pO_2$ is a function of temperature and reversibly depends on it as long as no oxygen is exchanged with the environment.

Figure 1:
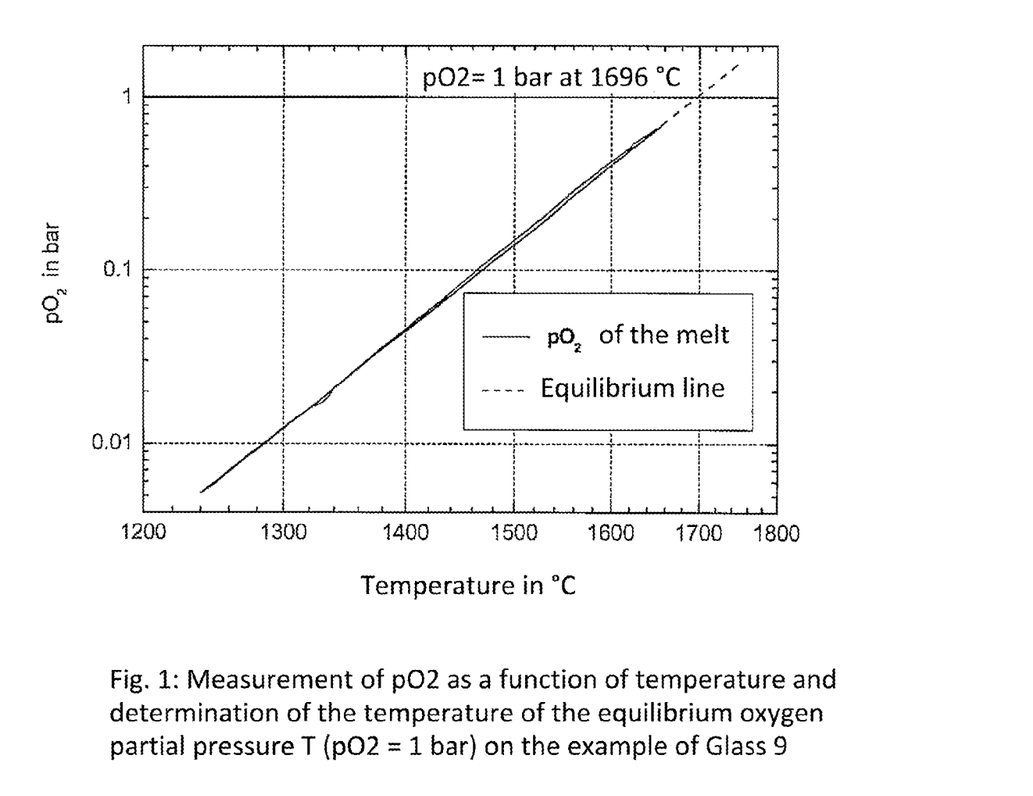
FIG. 1 A diagram, in which the oxygen partial pressure is plotted against temperature for a glass according to the invention.

FIG. 1 shows the measurement of $pO_2(T)$ for Glass 9 and the determination of the characteristic temperature T ($pO_2$=1 bar). Since the glass melt already delivers oxygen to the environment at high temperatures close to the temperature of the equilibrium oxygen partial pressure T ($pO_2$=1 bar), this leads to the circumstance that the value of this characteristic temperature is changed. Thus, in the measurement, the temperature of the glass increases up to approximately 40° C. below the characteristic temperature T ($pO_2$=1 bar) and the value was determined by extrapolation of the measured straight line of log $pO_2$ proportional to 1/T (see FIG. 1).

The initial glasses of Table 1 were melted from raw materials common in the glass industry at temperatures of approximately 1620° C. for 4 hours. After melting the mixture in crucibles of sintered silica glass, the melts were recast in the Pt/Rh crucible having an inner crucible of silica glass and homogenized by stirring at temperatures of 1550° C. for 30 minutes. After this homogenizing, different temperature treatments were conducted for the refining. The maximum melting and refining temperatures and times are found in Table 1.

Glasses 2, 3, 5, 6, 8, 10, 11, 13 were refined for 2 hours at 1640° C.

Subsequently, pieces with dimensions of approximately 140×100×30 mm³ were cast.

Glasses 1, 4, 7, 9, 12 and the comparative glass were subjected to a high-temperature refining with the temperatures and times indicated in Table 1 in order to obtain good bubble qualities and to adjust reducing conditions corresponding to the indicated temperature T ($pO_2$=1 bar). Prior to casting the refined glass melt, the temperature was reduced to approximately 1700° C. The cast pieces were cooled at room temperature in order to avoid stresses in a cooling oven, beginning at a temperature of approximately 20° C. below the transformation temperature of the glasses. The test samples for the measurements were prepared from the cast pieces.

The positive influence of the high-temperature refining with respect to the bubble quality is also observed in the laboratory melts. The absolute values of the bubble counts in the laboratory melts are several orders of magnitude higher than those of a large-scale production melt due to the technical conditions (different surface-to-volume ratio in laboratory melts). The relative differences are very informative. The melts refined conventionally at about 1640° C. have approximately 1000 to 5000 bubbles/kg of glass, and with high-temperature refining they have approximately 200 to 2000 bubbles/kg. With the same composition, high-temperature refining supplies the better values. In large-scale production, the desired qualities of less than 10 bubbles/kg of glass are obtained for these better values.

Glasses 1, 2, 3 as well as 7, 8 and 9, 10 have the same compositions, but were melted differently. Glass 1 was subjected to a high-temperature annealing. Glass 3 was adjusted to become reducing by addition of 1 wt. % sugar to the mixture and compared to Glass 2 refined at the same temperature. Consequently, the temperatures also are different for the equilibrium oxygen partial pressure. The transmission values of the glass ceramics obtained with the same ceramicizing conditions differ due to the different reducing conditions of the crystallizable initial glasses that are associated with these temperatures. In the case of low maximum temperatures of the melt, higher fractions of $V_2O_5$ or higher ceramicizing temperatures are required in order to equilibrate the transmission values.

After refining and standing at 1600° C. for 50 h in a 14-liter capacity Pt/Rh10 crucible, Glasses 1, 4 and the Comparative glass 13, as well as shards of the commercially produced glass ceramic Ceran Color® were formed with a laboratory rolling mill into typical cooktop plates. The laboratory rolling device comprises shortened original manufacturing rollers.

The lower roller is structured for the production of a conventional roughened cooktop underside. After cooling for the relief of stresses, the test samples for the measurements and plates of dimensions of 18 cm×18 cm×4 mm for the investigations relative to flatness with rapid ceramicizing are prepared from the obtained glass strip of approximately 200 mm width, 4 mm thickness and 2 m length. The plates were ceramicized in a laboratory oven with homogeneous, controllable upper and lower heating on a flat ceramic base plate. Heating was conducted at 10° C./min to 750° C. with a holding time of 15 min. Then heating was conducted again at 4° C./min to 900° C. with a holding time of 15 min, followed by rapid cooling to room temperature. During the entire program, the upper temperature in the oven was 6° C. higher relative to the underside. In this way, the glass-ceramic plates were shaped like domes in a targeted manner. The deviation from flatness for Comparative glass 13 amounted to 2.1±0.2 mm (6 tests), for Ceran Color® it was 0.6±0.1 mm (4 tests) and for both Glasses 1 and 4, it was 0.5±0.1 mm (3 tests). Since it is shown for the glass-ceramic material Ceran Color® produced on a large scale that it can be ceramicized with the required flatness in less than 80 min, this is also shown for the glasses according to the invention by the relative experimental comparison.

Table 2 shows the ceramicizing conditions and properties of the obtained glass ceramics and the comparative ceramics 2, 4, 17 outside the invention. The initial glasses are ceramicized with the following temperature/time programs, and the values for $T_{max}$ and $t_{max}$ are indicated in Table 2.

TABLE 2

Ceramicizing conditions and properties of glass ceramics according to the invention and comparative glass ceramics, Examples 2, 4, 17

| Example No. | | 1 | 2 | 3 | 4 | 5 | 6 | 7 | 8 | 9 |
|---|---|---|---|---|---|---|---|---|---|---|
| Glass No. | | 1 | 2 | 2 | 3 | 3 | 4 | 4 | 5 | 6 |
| Ceramicizing program | | 1 | 1 | 1 | 1 | 1 | 2 | 2 | 2 | 2 |
| $T_{max}$ | ° C. | 900 | 900 | 940 | 900 | 860 | 890 | 875 | 875 | 875 |
| $t_{max}$ | min | 15 | 15 | 15 | 15 | 15 | 10 | 10 | 10 | 10 |
| Properties ceramicized: | | | | | | | | | | |
| Density | g/cm³ | 2.547 | | 2.547 | | 2.541 | | 2.546 | 2.526 | 2.532 |
| Thermal expansion: | | | | | | | | | | |
| $\alpha_{20/700}$ | $10^{-6}$ K | 0.23 | | 0.58 | | 0.35 | | 0.32 | 0.01 | 0.20 |
| Transmission Standard light C. 2° | | | | | | | | | | |
| 400 nm | % | 0.04 | 0.09 | 0.02 | 0.01 | 0.02 | 0.05 | 0.06 | 0.13 | 0.11 |
| 450 nm | % | 0.16 | 0.57 | 0.27 | 0.03 | 0.10 | 0.20 | 0.25 | 0.35 | 0.31 |
| 500 nm | % | 0.31 | 1.15 | 0.61 | 0.05 | 0.17 | 0.17 | 0.22 | 0.13 | 0.13 |
| 550 nm | % | 0.78 | 2.60 | 1.40 | 0.15 | 0.48 | 0.33 | 0.43 | 0.22 | 0.24 |
| 630 nm | % | 4.81 | 10.8 | 6.65 | 1.57 | 3.85 | 4.42 | 5.32 | 5.19 | 5.34 |
| 700 nm | % | 16.7 | 27.2 | 19.8 | 8.78 | 15.9 | 18.8 | 21.2 | 24.4 | 24.5 |
| 1600 nm | % | 69.4 | 70.0 | 69.6 | 67.8 | 67.6 | 54.8 | 55.8 | 48.0 | 48.8 |
| Light transmission | % | 1.4 | 3.9 | 2.2 | 0.4 | 1.0 | 1.0 | 1.2 | 1.0 | 1.1 |
| X-ray diffraction | | | | | | | | | | |
| High-quartz phase content | % | 62 | | 50 | | 60 | | 61 | 65 | 63 |

TABLE 2-continued

Ceramicizing conditions and properties of glass ceramics according to the invention and comparative glass ceramics, Examples 2, 4, 17

| | | | | | | | | | | | |
|---|---|---|---|---|---|---|---|---|---|---|---|
| Average crystallite size | nm | 48 | — | | 38 | | 38 | | 32 | | 35 |

| | | | | | | | | | | | |
|---|---|---|---|---|---|---|---|---|---|---|---|
| Example No. | | 10 | 11 | 12 | 13 | 14 | 15 | 16 | 17 | 18 | 19 |
| Glass No. | | 7 | 8 | 8 | 9 | 10 | 11 | 11 | 13 | | 12 |
| Ceramicizing program | | 2 | 2 | 2 | 2 | 2 | 1 | 2 | 2 | 2 | 2 |
| $T_{max}$ | °C. | 890 | 915 | 930 | 915 | 935 | 930 | 930 | 930 | 915 | 915 |
| $t_{max}$ | min | 10 | 10 | 10 | 5 | 10 | 15 | 15 | 15 | 3 | 3 |
| Properties ceramicized: | | | | | | | | | | | |
| Density | g/cm³ | 2.548 | | 2.554 | 2.540 | 2.544 | 2.522 | 2.525 | 2.527 | 2.546 | 2.543 |
| Thermal expansion | | | | | | | | | | | |
| $\alpha_{20/700}$ | $10^{-6}$ K | 0.11 | | 0.07 | 0.02 | −0.04 | 0.02 | 0.01 | −0.14 | 0.24 | 0.23 |
| Transmission Standard light C. 2° | | | | | | | | | | | |
| 400 nm | % | 0.07 | 0.16 | 0.14 | 0.02 | 0.06 | 0.03 | 0.03 | 0.01 | 0.03 | 0.30 |
| 450 nm | % | 0.20 | 0.57 | 0.47 | 0.16 | 0.29 | 0.18 | 0.19 | 0.04 | 0.15 | 0.38 |
| 500 nm | % | 0.16 | 0.46 | 0.37 | 0.19 | 0.29 | 0.35 | 0.37 | 0.15 | 0.28 | 0.40 |
| 550 nm | % | 0.36 | 0.86 | 0.68 | 0.51 | 0.67 | 0.85 | 0.90 | 0.92 | 0.72 | 0.85 |
| 630 nm | % | 5.37 | 8.91 | 7.48 | 7.90 | 8.51 | 5.03 | 5.21 | 9.96 | 4.72 | 5.19 |
| 700 nm | % | 22.9 | 29.4 | 26.4 | 29.3 | 29.2 | 17.4 | 17.7 | 28.6 | 17.0 | 18.3 |
| 1600 nm | % | 55.2 | 54.6 | 54.8 | 54.6 | 54.4 | 72.4 | 72.5 | 82.2 | 71.5 | 76.7 |
| Light transmission | % | 1.2 | 2.2 | 1.8 | 1.7 | 2.0 | 1.5 | 1.6 | 2.5 | 1.4 | 1.6 |
| X-ray diffraction | | | | | | | | | | | |
| High-quartz phase content | % | 68 | | 70 | 75 | 72 | 64 | 64 | 73 | 62 | 63 |
| Average crystallite size | nm | 38 | | 46 | 43 | 44 | 46 | 44 | 43 | 44 | 42 |

Ceramicizing program 1:
a) Heating within 15 minutes from room temperature to 680° C.;
b) Increasing the temperature from 680 to 800° C. within 34.5 min, then heating at 10° C./min to 750° C., holding time of 15 min at 750° C., heating at 4° C./min to 800° C.;
c) Increasing the temperature from 800° C. to $T_{max}$ and holding time $t_{max}$ at a heating rate of 4° C./min;
d) Cooling to 800° C. at 10° C./min; then rapid cooling to room temperature.

Ceramicizing program 2:
a) Heating within 5 minutes from room temperature to 680° C.;
b) Increasing the temperature from 680 to 800° C. within 19 min, then heating at 10° C./min to 730° C., further heating at 5° C./min to 800° C.;
c) Increasing the temperature from 800° C. to $T_{max}$ and holding time $t_{max}$ at a heating rate of 5° C./min;
d) Cooling to 800° C. at 10° C./min, then rapid cooling to room temperature.

For the Comparative glass ceramics, Examples 2 and 4, the adjusted $pO_2$ values in the initial glass do not lead to light transmission according to the invention. In comparison to Example 1, this shows the influence of the adjusted redox condition, since the examples were produced with the same ceramicizing conditions.

This can be corrected by adjusting the ceramicizing conditions accordingly (Examples 3 and 5). The initial glasses 1, 2 and 3 of Examples 1 to 5 possess the same composition and differ only in the redox state adjusted for the melt.

The values for the average crystallite size and the fraction of high quartz mixed crystal phase were determined by x-ray diffraction.

The examples provide the desired very low values of thermal expansion (measured in the temperature region between room temperature and 700° C.) due to their content of high quartz mixed crystals as the predominant crystal phase. The characteristic values of the invention for transmission at different wavelengths, as well as for light transmission, which is equivalent to "brightness" Y, are listed in the table. The values were determined on polished plates with a thickness of 4 mm, which is typical for cooktops. The optical measurements were produced with standard light C, 2 degrees.

Figure 2:
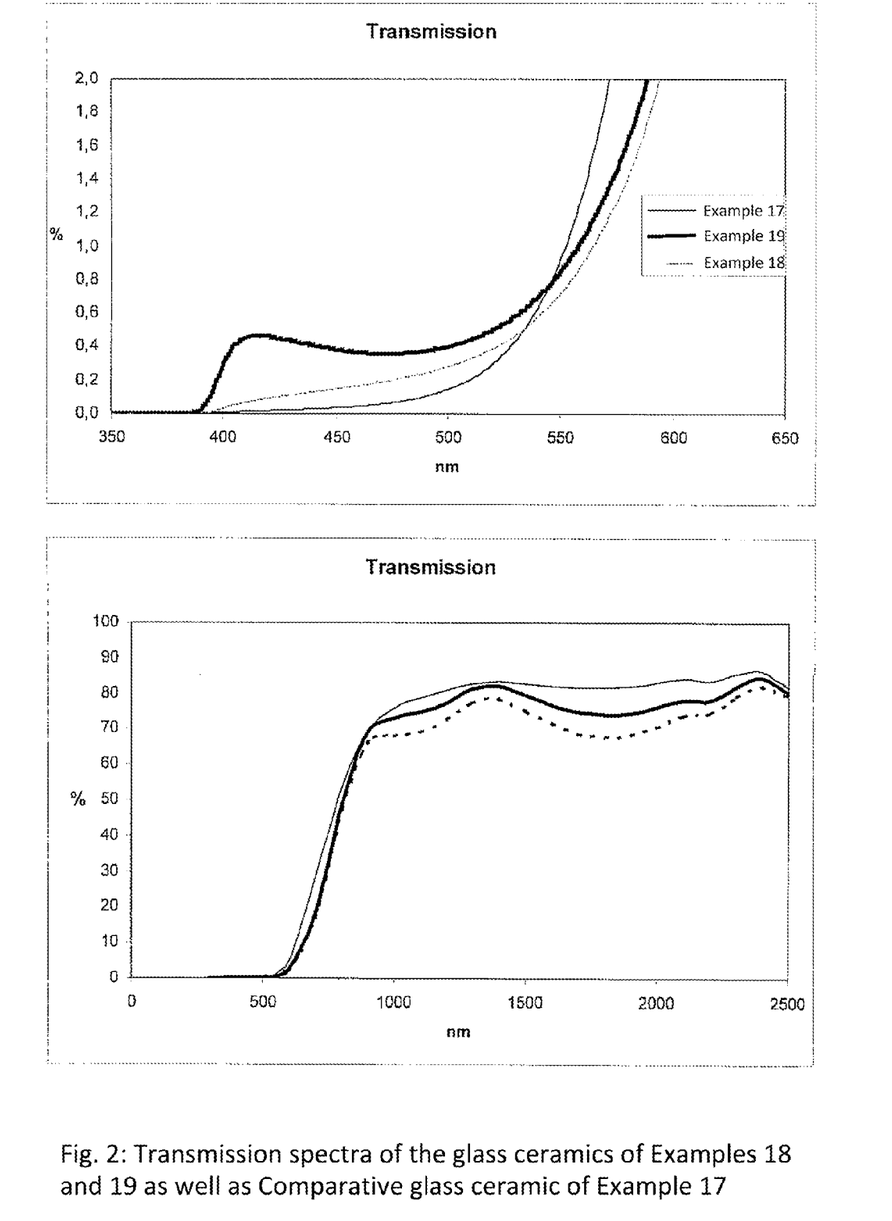
FIG. 2 Two diagrams that show the transmission curves of glass ceramics according to the invention.
Figure 3:
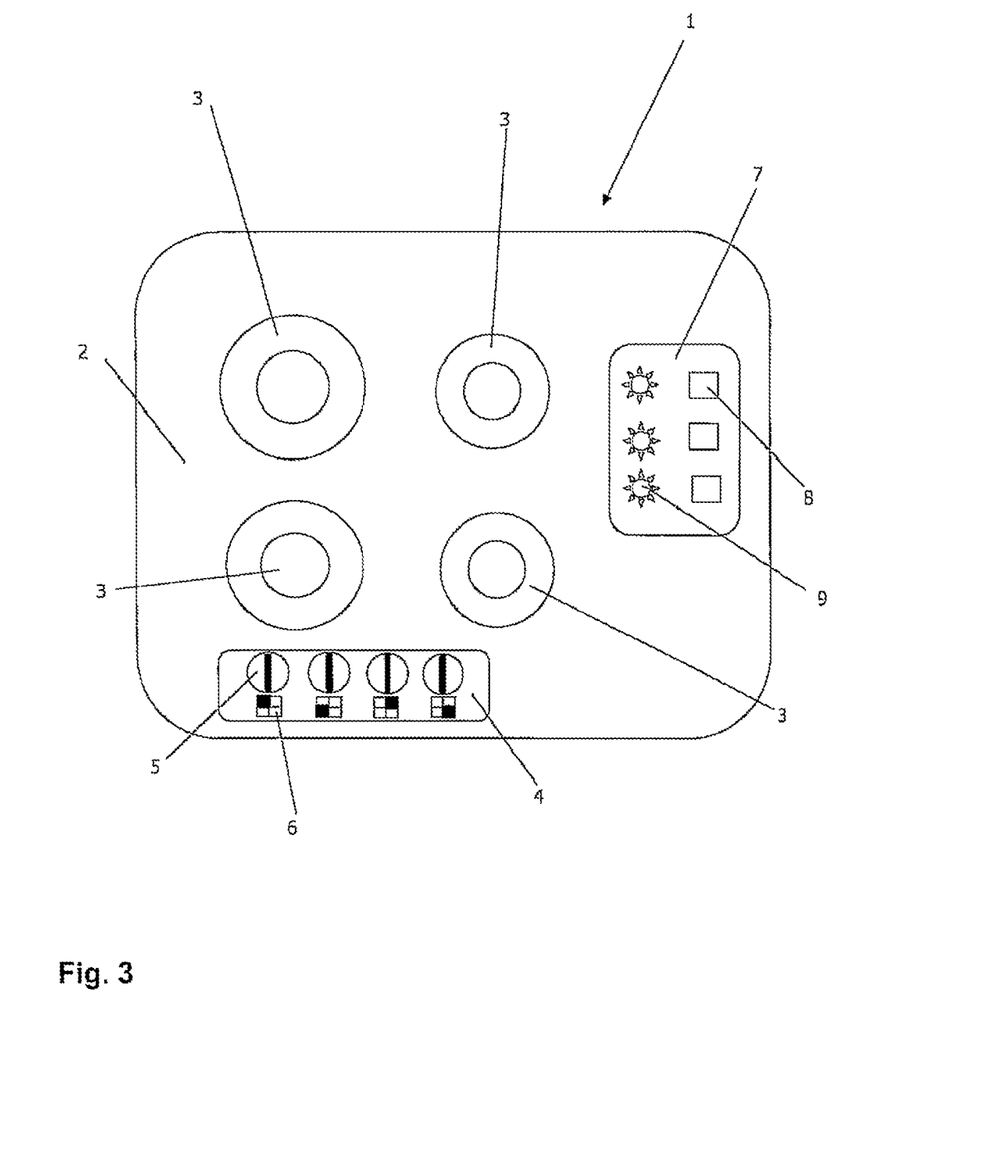
FIG. 3 A top view onto a cooktop with information fields according to the invention for temperature states and malfunction conditions.
Figure 4:
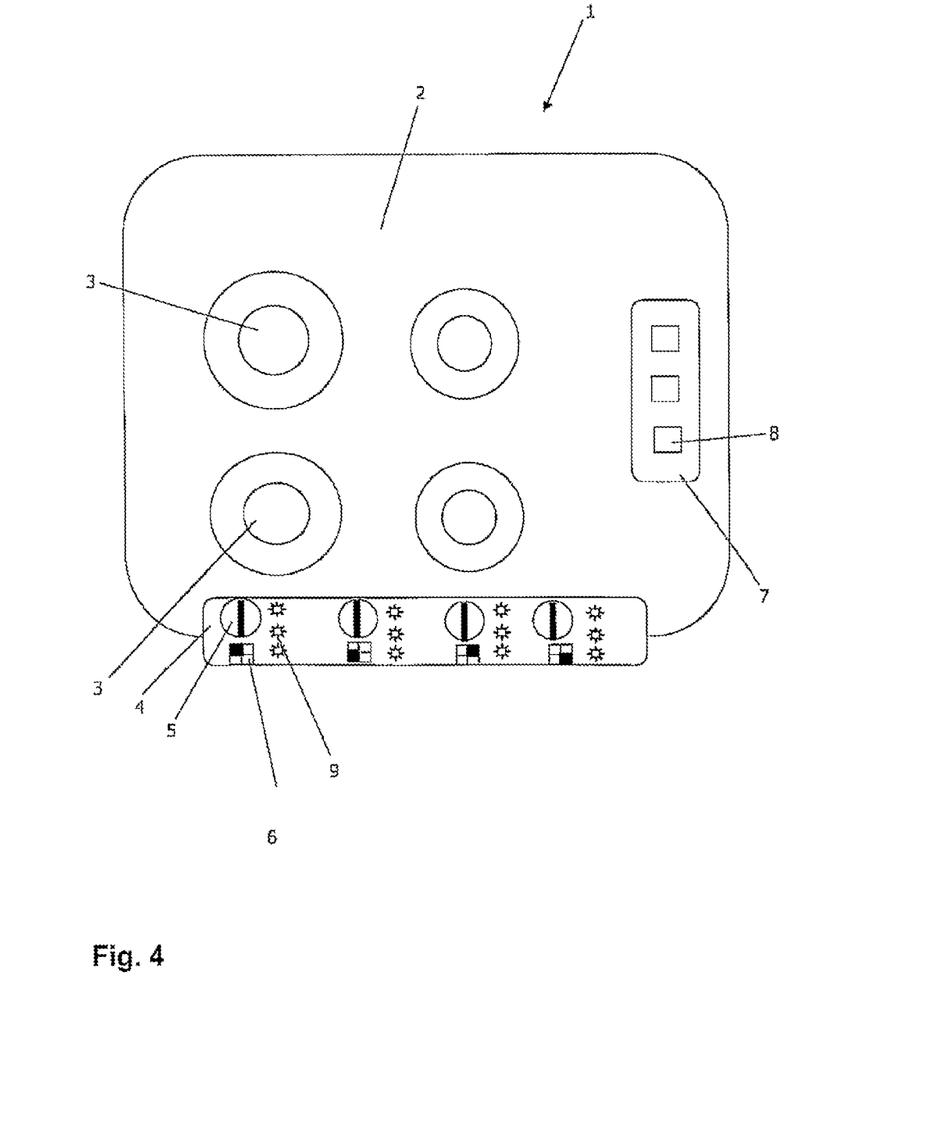
FIG. 4 Another embodiment of the arrangement of the fields.
Figure 5:
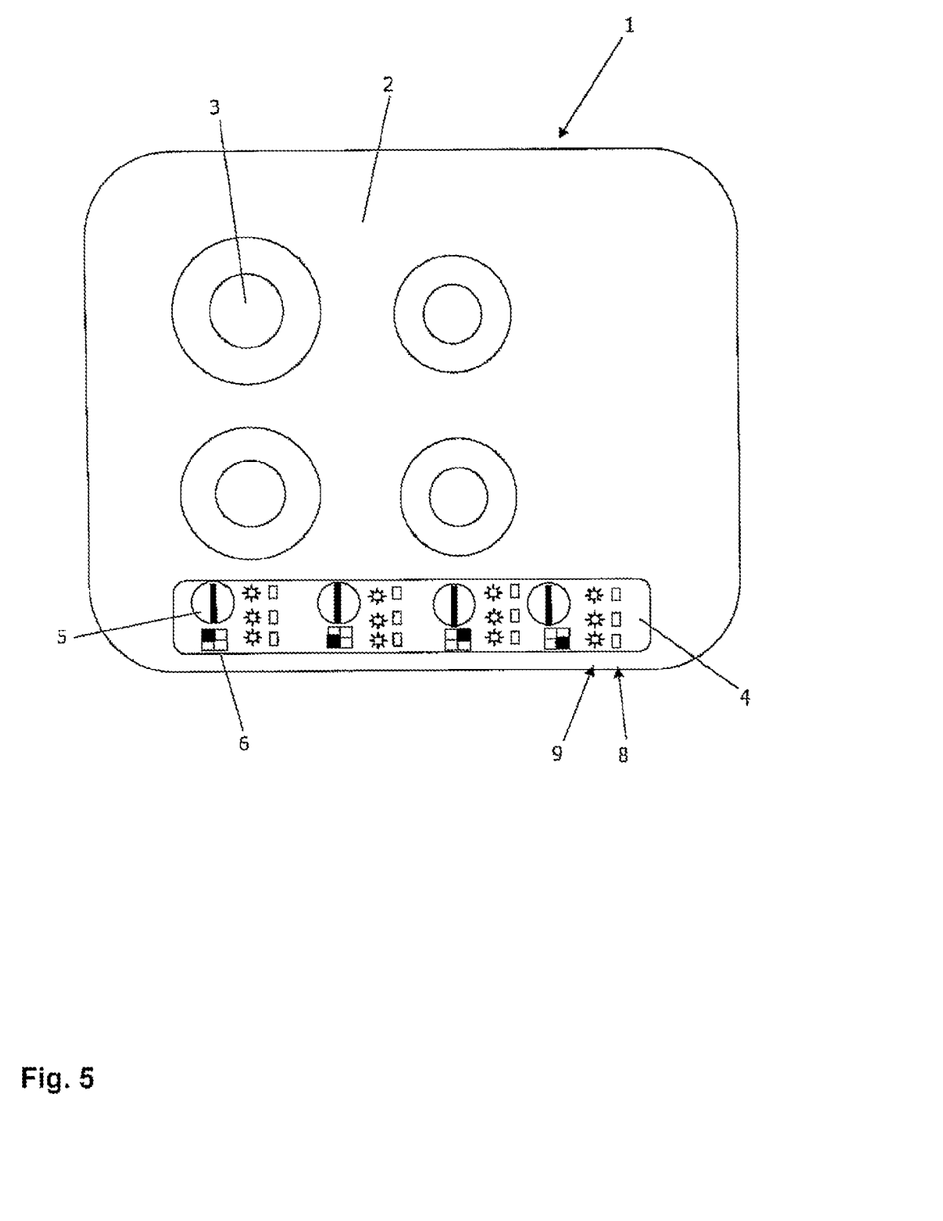
FIG. 5 Another embodiment of the fields.

In an additional Example 18, a composition according to Glass 1 was melted down in large-scale production, and by means of high-temperature refining at approximately 1770° C., a temperature of 1610° C. was set for 15 min, for the equilibrium oxygen partial pressure $pO_2=1$ bar. The bubble quality of this glass was excellent and amounted to <3 bubbles/kg of glass. A roughened glass strip of 4 mm thickness was produced for the shaping and cooled in a cooling furnace in order to avoid stresses. Cooktops with dimensions of 500×500×4 mm were cut from this glass strip and ceramicized in a large-scale roller furnace. The ceramicizing program corresponded to Program 2 (Table 2) and the crystallizable glass plates were placed on a ceramic flat base plate. The obtained glass ceramics provided a very good flatness of <0.1% in their diagonal dimension. The transmission curve of these glass ceramics according to the invention is compared in FIG. 2 for the Comparative glass ceramic of Example 17 and Glass Example 19 according to the invention. In the wavelength region essential for the invention in visible light of 400 to 600 nm, the transmission curve of the glass ceramic according to the invention that is advantageous for higher display capability is shown by values above 0.1% and good UV blocking below 350 nm.

A cooktop that is produced based on one of the above-described glass ceramics is shown in FIGS. 3 to 6. As these figures show, the cooktop comprises, for example, a flat glass-ceramic plate 2 with round cooking sites or burners 3, in the present example, four burners 3.

In the edge region of plate 2, an actuating panel 4 is also present. Actuating panel 4 comprises a knob 5 for each burner 3. In the present example, four knobs 5 are thus present, whereby knobs 5 are formed in the known way and the cooktops can be actuated either continuously or in steps relative to heating power. Characteristic fields 6 are also present, which indicate to the user by simple symbols which knob 5 belongs to which burner 3.

Also, a safety and warning field 7 is provided in a lateral region of plate 2, preferably in another lateral region of plate 2.

The safety and warning field 7 comprises, for example, 2 rows with displays. Displays 8 are present, for example, for an appliance malfunction, and displays 9 that indicate a temperature state are also present. In the example shown in FIG. 3, there are arranged three displays 8 disposed under one another for malfunctions of the entire appliance, and in addition, three displays disposed under one another for the temperature state of one of the burners 3. In this embodiment, it is communicated to the user that one of the burners, for example, is in an elevated temperature state and/or the appliance or parts of the appliance is (are) malfunctioning.

In another advantageous embodiment (FIG. 4), four burners 3 are also disposed in the glass-ceramic plate 2, whereby the actuating panel 4 also provides four knobs 5 and a symbol is present for each knob, assigned to each knob 5. Next to each knob 5 is found a display element 9 for indicating the temperature state, so that in this embodiment, the temperature state with symbols belonging to the plate of each burner 3 is disposed adjacent to its knob 5. In safety and warning field 7 there are present three malfunction displays 8, one lying above the other, which can indicate a malfunction or the normal state for the entire device.

In another advantageous embodiment (FIG. 5), a separate safety and warning field 7 is dispensed with, whereby displays 9 for indicating a temperature state and malfunction displays 8 are each disposed next to the respective knob 5 for a burner 3. Therefore, the temperature state of each burner 3 and the malfunction condition of each burner 3 are indicated individually to the user.

If symbols are added in addition to the color codes for the display of a critical temperature state and/or an appliance malfunction (FIG. 6) for example, three temperature displays 9 and three malfunction displays 8 are disposed in two columns in a safety and warning field 7. For example, inside the temperature display, a corresponding flame symbol 10a may be present for a high critical temperature in a display 9a, and a smaller flame symbol 10b may be present for a high, but not critical, temperature in a display 9b.

Figure 6:
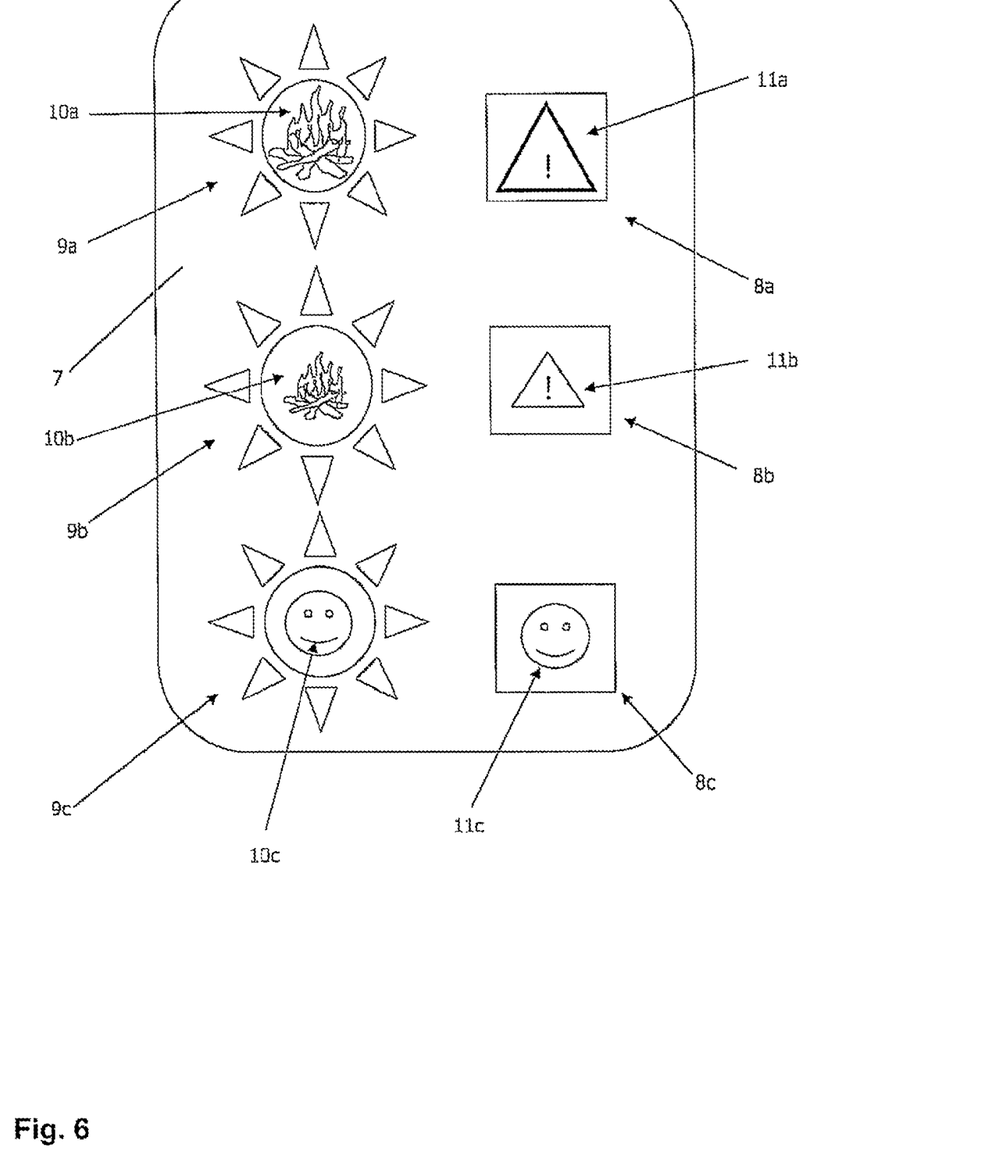
FIG. 6 As an example, the arrangement of displays in a display field with additional symbols.

In the display fields 8a, 8b, 8c for malfunction conditions, a symbol 11a which indicates a critical malfunction may be present in a field 8a for the display of a critical malfunction condition. A corresponding smaller or less distinct symbol 11b can be present in a display field 8b for display of a malfunction that does not adversely affect operating safety, for example.

In displays 8c, 9c, each of which indicates an orderly state or the absence of a critical temperature, corresponding symbols 10c, 11c may be present, which indicate to the user, without deliberation, that the appliance is found in an orderly, uncritical state.

The symbol arrangement according to FIG. 6 may be transferred, of course, to the three examples of embodiment, so that the corresponding signals are also disposed next to the knobs or other sites of the glass-ceramic plate 2.

In another embodiment (not shown), only one display 8 for a critical malfunction state and only one display 9 for a temperature state is present in each case. These displays 8, 9 provide luminous color elements, which can allow the displays to be illuminated either in steps in different colors or continuously as a gradient of different colors.

In this case, the single display 8 and the single display 9 can be disposed each time in a safety and warning field 7. It is also possible, however, to provide a single display element 8 and one display element 9 for each knob 5.

Likewise, of course, a display 8 and a display 9 can be assigned to each cooking surface, i.e., also to each knob 5.

In another advantageous embodiment (not shown), the temperature display 9 or the malfunction display 8 may also be present in the form of lights or segments of different colors disposed in a circle, in which, for example, the colors in an uncritical region are green (for no malfunction) and blue (for no high temperature), and increasing temperature and/or increasing degree of malfunction are indicated by changing colors along the circle. In the same way, these temperature increases can also be indicated along a bar.

It is of advantage for the invention that simple displays that are intuitively understood are created for the user, which make it possible for him to discern without thinking about it very much, the dangers that may occur from heat or warmth or that may occur from malfunctioning of the appliance. In this way, a clear increase in application safety is achieved. Further, ergonomics and trust in the appliance are increased.

The invention was disclosed based on a cooktop, in particular a cooktop having a glass-ceramic plate. Nevertheless, the invention is applicable with equal success to any type of electrical appliances, particularly household appliances.

The invention claimed is:

1. A transparent, dyed cooktop with color display capability, comprising:
    a glass ceramic having high quartz mixed crystals as a predominant crystal phase, the glass ceramic not containing chemical refining agents arsenic oxide and antimony oxide except for unavoidable trace amounts, the glass ceramic having a transmission value of greater than 0.1% in a visible region of light in an entire wavelength region greater than 450 nm, a light transmission in the visible region of 0.8 to 5%, and a transmission value in an infrared region at 1600 nm from 45 to 85%; and
    a display apparatus having a display device configured to indicate a different operating condition with a feature selected from the group consisting of a color, a symbol, and combinations thereof,
    wherein the glass ceramic comprises coloring oxides $Fe_2O_3$ and $V_2O_5$ with a content of the $Fe_2O_3$ and being at least as high as a content of the $V_2O_5$ to achieve the transmission values.

2. The cooktop according to claim 1, wherein the transmission values are greater than 0.15% at 450 nm, greater than 0.15% at 500 nm, greater than 0.25% at 550 nm, between 3-9% at 630 nm, between 50-80% at 1600 nm, and a light transmission in the visible region of 1.0-2.0%.

3. The cooktop according to claim 1, wherein the glass ceramic comprises a composition, in weight percent based on oxide, that essentially comprises:

| | |
|---|---|
| Li$_2$O | 3.0-4.2 |
| ΣNa$_2$O + K$_2$O | 0.2-1.5 |
| MgO | 0-1.5 |
| ΣCaO + SrO + BaO | 0-4 |
| ZnO | 0-2 |
| B$_2$O$_3$ | 0-2 |
| Al$_2$O$_3$ | 19-23 |
| SiO$_2$ | 60-69 |
| TiO$_2$ | 2.5-4 |
| ZrO$_2$ | 0.5-2 |
| P$_2$O$_5$ | 0-3 |
| SnO$_2$ | 0.1-<0.6 |
| ΣTiO$_2$ + ZrO$_2$ + SnO$_2$ | 3.8-6 |
| V$_2$O$_5$ | 0.01-0.06 |
| Fe$_2$O$_3$ | 0.03-0.2, |
| with the condition that: $1 < Fe_2O_3/V_2O_5 < 8$. | |

4. The cooktop according to claim 1, wherein the glass ceramic comprises an initial glass having a rapid ceramicizing capability and a composition, in weight percent based on oxide, that essentially comprises:

| | |
|---|---|
| Li$_2$O | 3.2-4.2 |
| Na$_2$O | 0.1-1 |
| K$_2$O | 0.1-1 |
| ΣNa$_2$O + K$_2$O | 0.2-1.5 |
| MgO | 0-1.5 |
| ΣCaO + SrO + BaO | 0.1-4 |
| ZnO | 0-2 |
| B$_2$O$_3$ | 0-1 |
| Al$_2$O$_3$ | 19-23 |
| SiO$_2$ | 60-68 |
| TiO$_2$ | 2.8-4 |
| ZrO$_2$ | 0.8-1.8 |
| P$_2$O$_5$ | 0-1.5 |
| SnO$_2$ | 0.1-<0.6 |
| ΣTiO$_2$ + ZrO$_2$ + SnO$_2$ | 4.4-6 |
| V$_2$O$_5$ | 0.01-0.05 |
| Fe$_2$O$_3$ | 0.07-0.18, |
| with the condition that: $2 < Fe_2O_3/V_2O_5 < 6$. | |

5. The cooktop according to claim 4, wherein the composition, in weight percent based on oxide, further comprises:

| | |
|---|---|
| CaO | 0.2-1 |
| SrO | 0.1-1. |

6. The cooktop according to claim 1, wherein the glass ceramic comprises an initial glass having melting capability and devitrification resistance with a processing temperature of less than 1320° C., an upper devitrification limit of at least 30° C. below the processing temperature, the glass ceramic having a composition, in weight percent based on oxide, that comprises:

| | |
|---|---|
| Li$_2$O | 3.2-4.0 |
| Na$_2$O | 0.2-1 |
| K$_2$O | 0.1-1 |
| ΣNa$_2$O + K$_2$O | 0.4-1.2 |
| MgO | 0.1-1.2 |
| CaO | 0.2-1 |
| SrO | 0-1 |
| BaO | 0-3 |
| ΣCaO + SrO + BaO | 0.2-4 |
| ZnO | 0-1.8 |
| B$_2$O$_3$ | 0-1 |
| Al$_2$O$_3$ | 19-22 |
| SiO$_2$ | 62-67 |
| TiO$_2$ | 2.8-4 |
| ZrO$_2$ | 0.5-1.6 |
| P$_2$O$_5$ | 0-1.5 |
| SnO$_2$ | 0.1-0.5 |
| ΣTiO$_2$ + ZrO$_2$ + SnO$_2$ | 4.2-6 |
| V$_2$O$_5$ | 0.01-0.05 |
| Fe$_2$O$_3$ | 0.08-0.15, |
| with the condition that: $2 < Fe_2O_3/V_2O_5 < 6$. | |

7. The cooktop according to claim 6, further comprising an equilibrium oxygen partial pressure pO$_2$ of the glass ceramic or of the initial glass of 1 bar at a temperature higher than 1580° C.

8. The cooktop according to claim 7, wherein the equilibrium oxygen partial pressure is set by a temperature of the glass melt higher than 1700° C.

9. The cooktop according to claim 7, further comprising a V$_2$O$_5$ content of less than 0.04 weight percent.

10. The cooktop according to claim 3, further comprising a bubble count of fewer than 5 bubbles per kilograms and wherein the Fe$_2$O$_3$ content amounts to at least 20 weight percent of the SnO$_2$ content.

11. The cooktop according to claim 1, wherein the feature comprises a color selected from the group consisting of red, blue, green, yellow, orange, white, and combinations thereof.

12. The cooktop according to claim 1, wherein the display device displays a temperature state, a malfunction condition, and any combination thereof.

13. The cooktop according to claim 12, wherein the display device has differently colored lighting elements having at least two different colors representative of different operating states.

14. The cooktop according to claim 13, wherein the differently colored lighting elements comprise a red lighting element and a blue lighting element for displaying the temperature state.

15. The cooktop according to claim 13, wherein the differently colored lighting elements comprise at least a red lighting element and a green lighting element for displaying the malfunction condition.

16. The cooktop according to claim 13, wherein the display device displays the at least two different colors continuously as a color gradient.

17. The cooktop according to claim 1, wherein the display device comprises a red lighting element, an orange lighting element, and a blue lighting element to indicate a temperature state.

18. The cooktop according to claim 1, wherein the display device comprises a single lighting element that can illuminate red, orange, and blue to indicate a temperature state.

19. The cooktop according to claim 1, wherein the display device comprises a red lighting element, an orange lighting element, and a green lighting element to indicate a malfunction condition.

20. The cooktop according to claim 1, wherein the display device comprises a single lighting element that can illuminate red, orange, and green to indicate a malfunction condition.

\* \* \* \* \*